United States Patent
Han et al.

(10) Patent No.: US 10,401,950 B2
(45) Date of Patent: Sep. 3, 2019

(54) METHOD FOR OBTAINING SENSOR DATA AND ELECTRONIC DEVICE USING THE SAME

(71) Applicant: Samsung Electronics Co., Ltd., Gyeonggi-do (KR)

(72) Inventors: Seunghoon Han, Gyeonggi-do (KR); Shingil Kim, Gyeonggi-do (KR); Dongil Son, Gyeonggi-do (KR); Woosuk Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 170 days.

(21) Appl. No.: 15/332,288

(22) Filed: Oct. 24, 2016

(65) Prior Publication Data

US 2017/0115729 A1   Apr. 27, 2017

(30) Foreign Application Priority Data

Oct. 23, 2015   (KR) ........................ 10-2015-0147919

(51) Int. Cl.

| | |
|---|---|
| *G06F 3/01* | (2006.01) |
| *G06F 11/16* | (2006.01) |
| *G06F 3/0346* | (2013.01) |
| *G06F 1/26* | (2006.01) |
| *G06F 1/3206* | (2019.01) |
| *G06F 1/3234* | (2019.01) |
| *G06F 1/16* | (2006.01) |

(52) U.S. Cl.
CPC .............. *G06F 3/012* (2013.01); *G06F 1/163* (2013.01); *G06F 1/1654* (2013.01); *G06F 1/263* (2013.01); *G06F 1/325* (2013.01); *G06F 1/3206* (2013.01); *G06F 3/013* (2013.01); *G06F 3/0346* (2013.01)

(58) Field of Classification Search
CPC ...... G06F 3/012; G06F 1/1654; G06F 3/0346; G06F 3/013
See application file for complete search history.

(56) References Cited

U.S. PATENT DOCUMENTS

| | | | |
|---|---|---|---|
| 2010/0079356 A1* | 4/2010 | Hoellwarth | .......... G02B 27/017 345/8 |
| 2011/0238998 A1 | 9/2011 | Gartman et al. | |
| 2015/0287244 A1* | 10/2015 | Watanabe | ............. G06T 19/006 345/633 |

FOREIGN PATENT DOCUMENTS

| | | |
|---|---|---|
| JP | 5099777 | 12/2012 |
| JP | 2013529323 | 7/2013 |

* cited by examiner

*Primary Examiner* — Aneeta Yodichkas
(74) *Attorney, Agent, or Firm* — The Farrell Law Firm, P.C.

(57) ABSTRACT

Disclosed is an electronic device that is detachably coupled to a frame of a head-mounted device that can be mounted on a head of a user. The electronic device can consecutively perform tracking of the user's head using a sensor, when sensor data is abnormally received. Thereafter, if the sensor data is normally received from the head mounted device, the electronic device can consecutively perform the head tracking, enabling the user's action and the visual information to coincide with each other, thereby reducing inconvenience or misoperation which may occur in the case of the conventional head-mounted device.

14 Claims, 14 Drawing Sheets

METHOD FOR OBTAINING SENSOR DATA AND ELECTRONIC DEVICE USING THE SAME

PRIORITY

This application claims priority under 35 U.S.C. § 119(a) to a Korean Patent Application filed in the Korean Intellectual Property Office on Oct. 23, 2015 and assigned Serial No. 10-2015-0147919, the contents of which are incorporated herein by reference.

BACKGROUND

1. Field of the Disclosure

The present disclosure relates generally to an electronic device, and more particularly, to a method for obtaining sensor data using the electronic device.

2. Description of the Related Art

An electronic device, such as a portable terminal, can be coupled to a head-mounted device (HMD), such as virtual reality (VR) headset, and a user can view a screen image that is output from the electronic device through lenses of the HMD, thereby experiencing virtual reality.

The electronic device can acquire sensor data from the HMD. For example, the HMD may have a sensor embedded therein to sense motion of a user's head. The HMD may transmit the sensor data that is acquired from the embedded sensor to the electronic device, which may calculate a rotation matrix, and may render a user's viewpoint to a three dimensional (3D) graphics library. The user can view a virtual reality screen that varies in accordance with the motion of the user's head.

If the sensor data is not normally acquired while the user experiences the virtual reality through the head-mounted device, the electronic device becomes unable to perform user head tracking. In this case, the electronic device becomes unable to perform rendering corresponding to the motion of the user's head, causing an inconsistency to occur between a user's action, such as a head motion, and visual information. Such visual inconsistency can cause the user to suffer from motion sickness or a headache, and to experience inconvenience or to perform a misoperation in using the head-mounted device.

As such, there is a need in the art for an electronic device that negates the inconvenience and misoperation-prone issues of the conventional head-mounted device.

SUMMARY

The present disclosure has been made to address the above-mentioned problems and disadvantages, and to provide at least the advantages described below.

Accordingly, an aspect of the present disclosure is to provide an electronic device that can consecutively perform head tracking, enabling the user's action and the visual information to coincide with each other, thereby reducing inconvenience or misoperation which may occur in the case of the conventional head-mounted device.

In accordance with an aspect of the present disclosure, an electronic device that is detachably coupled to a frame of a head-mounted device that can be mounted on a head of a user includes a display, a battery, a communication interface, at least one sensor, a processor electrically connected to the display, the battery, the communication interface, and the at least one sensor, and a memory electrically connected to the processor, wherein the memory, when executed, stores instructions that cause the processor to receive at least one signal from the head-mounted device through the communication interface, to sense whether the head-mounted device is electrically connected to an external power supply based on the at least one received signal, and to control the electronic device based on the sensing.

In accordance with another aspect of the present disclosure, an electronic device that is detachably coupled to a head-mounted device that can be mounted on a head of a user includes a display, a battery, a communication interface, at least one sensor, a processor electrically connected to the display, the battery, the communication interface, and the at least one sensor, and a memory electrically connected to the processor, wherein the memory, when executed, stores instructions that cause the processor to receive at least one signal from the head-mounted device through the communication interface, to acquire information related to the head-mounted device, the electronic device, or the user using the at least one sensor, and to control the electronic device based on a state of the at least one received signal.

In accordance with another aspect of the present disclosure, a method for tracking motion of a head of a user of an electronic device that is detachably coupled to a head-mounted device that can be mounted on the head of the user includes receiving at least one signal from the head-mounted device; sensing whether the head-mounted device is electrically connected to an external power supply based on the at least one received signal, and controlling the electronic device based on the sensing.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION OF EMBODIMENTS OF THE DISCLOSURE

Figure 1:
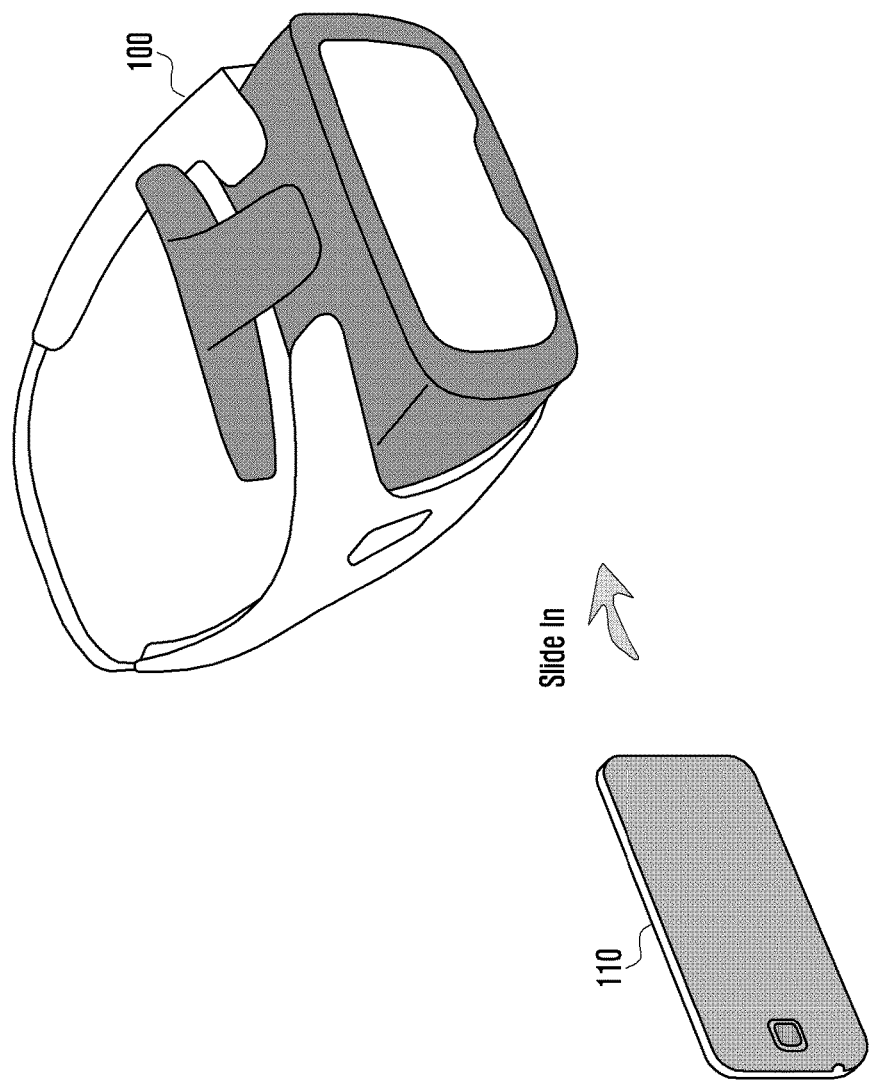
FIG. 1 illustrates coupling of an electronic device to a head-mounted device according to embodiments of the present disclosure.

Embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as an exemplification of the principles of the disclosure and is not intended to limit the disclosure to the specific embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. In the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

Expressions such as "a first" and "a second" in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure do not limit the present disclosure but are used to illustrate embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be understood that generally using terms defined in a dictionary have a meaning corresponding to that of a context of related technology and are not interpreted as having an ideal or excessively formal meaning unless explicitly defined.

In this disclosure, an electronic device may be a device that involves a communication function. For example, an electronic device may be a smart phone, a tablet PC (personal computer), a mobile phone, a video phone, an e-book reader, a desktop PC, a laptop PC, a netbook computer, a PDA (personal digital assistant), a PMP (portable multimedia player), an MP3 player, a portable medical device, a digital camera, or a wearable device, such as an HMD (head-mounted device) including electronic glasses, electronic clothes, an electronic bracelet, an electronic necklace, an electronic appcessory, or a smart watch.

According to some embodiments, an electronic device may be a smart home appliance that involves a communication function. For example, an electronic device may be a TV, a DVD (digital video disk) player, audio equipment, a refrigerator, an air conditioner, a vacuum cleaner, an oven, a microwave, a washing machine, an air cleaner, a set-top box, a TV box, such as Samsung HomeSync™, Apple TV™, Google TV™, etc.), a game console, an electronic dictionary, an electronic key, a camcorder, or an electronic picture frame.

According to some embodiments, an electronic device may be a medical device, such as MRA (magnetic resonance angiography), MRI (magnetic resonance imaging), CT (computed tomography), ultrasonography, etc.), a navigation device, a GPS (global positioning System) receiver, an EDR (event data recorder), an FDR (flight data recorder), a car infotainment device, electronic equipment for a vessel, such as a marine navigation system or a gyrocompass, avionics, security equipment, or an industrial or home robot.

According to some embodiments, an electronic device may be furniture or part of a building or construction having a communication function, an electronic board, an electronic signature receiving device, a projector, or various measuring instruments, such as a water meter, an electric meter, a gas meter, or a wave meter. An electronic device disclosed herein may be one of the above-mentioned devices or any combination thereof. As well understood by those skilled in the art, the above-mentioned electronic devices are only examples and are not to be considered as a limitation of this disclosure.

In embodiments of the present disclosure, an HMD may confirm whether an electronic device or a display module device is mounted on a frame thereof, and may control the operation of an interface unit according to the result of the confirmation. Once the electronic device is mounted on the frame of the head-mounted device, the head-mounted device may transmit a user input signal and a sensor signal, which are sensed by the head-mounted device, to the electronic device. The electronic device may generate and display a virtual image based on the user input signal and the sensor signal that are received from the head-mounted device.

In embodiments of the present disclosure, if the display module device is mounted on the frame, the head-mounted device can sense that an external device is connected to the frame or the display module device through wired or wireless communication. If the external device is connected, the head-mounted device may control the display module device to receive a virtual image from the external device and to display the received virtual image. The head-mounted device may transmit the user input signal and the sensor signal, which are sensed by the head-mounted device, to the external device. The head-mounted device may receive the virtual image that is generated based on the user input signal and the sensor signal from the external device and may transmit the received virtual image to the display module device, which may display the received virtual image.

In embodiments of the present disclosure, the head-mounted device may sense that the external device is connected to the frame or the electronic device through wired or wireless communication while controlling the operation of an interface unit in accordance with the mount of the electronic device on the frame. If the external device is connected, the head-mounted device may receive the virtual image from the external device and may transmit the received virtual image to the electronic device. The electronic device may display the received virtual image using a display module of the electronic device.

In embodiments of the present disclosure, a user may mount the electronic device or the display module device to the frame in accordance with a use environment. The head-mounted device may control the operation of the interface according to the device mounted on the frame, so that the user can efficiently use the head-mounted display device to suit the use environment. Hereinafter, with reference to the accompanying drawings, the electronic device according to embodiments will be described. In the description, the term "user" may refer to a person who uses the electronic device or an artificial intelligence electronic device that uses the electronic device.

The embodiments of the present disclosure relate to an electronic device such as a portable terminal that is fastened to a head-mounted device. The portable terminal may become unable to normally acquire sensor data from the VR headset due to an external environment, such as inferior contact with the terminal, interrupt occurrence, software error, or lack of current, after being fastened to the VR headset. In this case, the portable terminal can consecutively perform tracking of the user's head using the sensor of the portable terminal. Thereafter, if the sensor data is received in a normal manner from the VR headset, the portable terminal can consecutively perform the head tracking. This enables the user's action and the visual information to coincide with each other, thereby reducing inconvenience or misoperation which may occur when the user uses the conventional head-mounted device.

FIG. 1 illustrates coupling of an electronic device to a head-mounted device according to embodiments of the present disclosure.

A head-mounted device 100 may be a VR headset. For example, the VR headset may not be mounted with an individual display module, but may operate through coupling with an external electronic device 110.

The head-mounted device 100 may be coupled to the portable terminal 110 in a slide-in manner, and may be devised so as to be easily attached to or detached from the portable terminal 110.

The portable terminal 110 may be independently used, and if it is mounted on the head-mounted device 100, may serve as a display, a processor, and a power supply for virtual reality. The head-mounted device 100 may include a lens, an input means, a head motion sensing unit, and/or a head mount unit.

Figure 2:
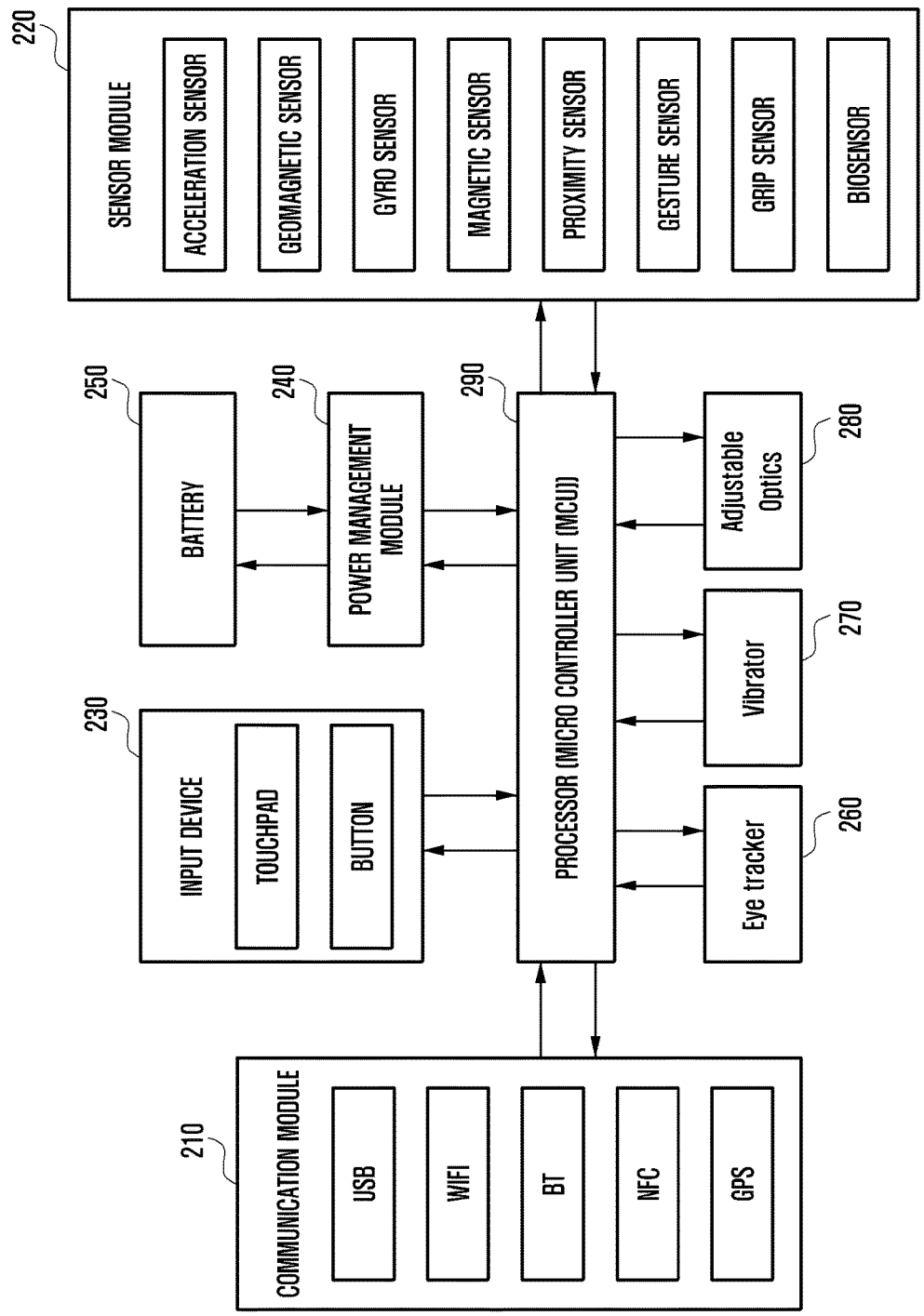
FIG. 2 illustrates the configuration of a head-mounted device according to embodiments of the present disclosure.

FIG. 2 illustrates the configuration of a head-mounted device according to embodiments of the present disclosure.

Referring to FIG. 2, the head-mounted device 100 may include a communication module 210, a sensor module 220, an input device 230, a power management module 240, a battery 250, an eye tracker 260, a motor (vibrator) 270, an adjustable optics 280 or a lens assembly (not illustrated), and a processor (micro controller unit (MCU)) 290. The head-mounted device 100 may further include other constituent elements, for example, a display module.

The communication module 210 may connect the head-mounted device 100 and the electronic device 110 to each other through wired and/or wireless communication to transmit/receive data. The communication module 210 may include a universal serial bus (USB) module, a wireless fidelity (Wi-Fi) module, a Bluetooth (BT) module, a near field communication (NFC) module, and a global positioning system (GPS). According to another embodiment, at least two of the Wi-Fi module, the BT module, the GPS module, and the NFC module may be included in one Integrated Chip (IC) or IC package.

The sensor module 220 may measure a physical amount or may sense the operating state of the head-mounted device 100, and may convert measured or sensed information into an electrical signal. The sensor module 220 may include, for example, at least one of an acceleration sensor, a geomagnetic sensor, a gyro sensor, a magnetic sensor, a proximity sensor, a gesture sensor, a grip sensor, and a biosensor. The sensor module 220 may further include a control circuit for controlling the one or more sensors included therein.

The head-mounted device 100 may sense whether the head-mounted device 100 is mounted using the proximity sensor or the grip sensor. Whether the head-mounted device 100 is mounted may be determined through sensing of at least one of IR recognition, pressure recognition, and capacitance (or permittivity) variation that are caused by the mount of the head-mounted device 100. The head-mounted device 100 may sense motion of the head of the user who wears the head-mounted device 100 using the acceleration sensor, the geomagnetic sensor, and the gyro sensor.

At least a part of constituent elements of the sensor module 220 may be included in the electronic device 110 that can be attached to or detached from the head-mounted device 100.

The gesture sensor may sense motion of a user's hand or finger as a control input of the head-mounted device 100.

The biosensor may include, for example, an E-nose sensor, an electromyography (EMG) sensor, an electroencephalogram (EEG) sensor, an electrocardiogram (ECG) sensor, and an iris sensor, and the head-mounted device 100 may recognize bio information of the user using the biosensor.

The input device 230 may include a touchpad or buttons. The touchpad may recognize a touch input in at least one of capacitive, resistive, infrared, and ultraviolet methods. The touchpad may further include a control circuit. If the touchpad is capacitive, it is possible to perform physical contact or proximity recognition. The touchpad may further include a tactile layer to provide tactile reaction to the user. The buttons may include, for example, physical buttons, optical buttons, or a keypad.

The touchpad may receive user's touch input, for example, a touchpad direct touch input or a hovering input. The electronic device 110 and the head-mounted device 100 may be connected to each other using an interface such as universal serial bus (USB), and the head-mounted device 100 may transmit a touch input signal that is sensed through the touchpad to the electronic device 110. The electronic device 110 may perform a function that corresponds to the touch input in response to the touch input that is received from the touchpad of the head-mounted device 100.

For example, a graphic user interface (GUI) may control the function of the electronic device 110 corresponding to the touch input that is sensed through the touch pad. The head-mounted device 100 may adjust the volume of an audio that is output from the electronic device 110 in response to the touch input that is sensed by the GUI for sound setting through the touch pad. The head-mounted device 100 may control an image that is displayed on the electronic device 110 in response to the touch input that is sensed by a GUI for image reproduction, such as virtual reality content through the touchpad.

The power management module 240 may supply a power for using the head-mounted device 100. The battery 250 may store or generate electricity and may supply the power to the head-mounted device 100 using the stored or generated electricity. The battery 250 may be included in a portion of the head-mounted device 100. The battery 250 may be included in the electronic device 110 that can be attached to or detached from the head-mounted device 100. The battery 250 may be functionally connected to an external power supply 120.

The eye tracker 260 may track a user's eye, for example, using at least one of electrical oculography (EOG) sensors, coil systems, dual purkinje systems, bright pupil systems, and dark pupil systems. The eye tracker 260 may further include a micro camera for eye tracking.

The motor (vibrator) 270 may convert an electrical signal into mechanical vibrations.

The adjustable optics 280 may adjust the lens distance of the head-mounted device 100 and the display position of the electronic device 110 through measurement of user's inter-pupil distance (IPD) so that the user can view the image that suits the user's own eyesight.

The processor 290 may control a plurality of hardwired constituent elements connected to the processor 290 through driving of the operating system (OS) or an embedded software program 110.

Figure 3A:
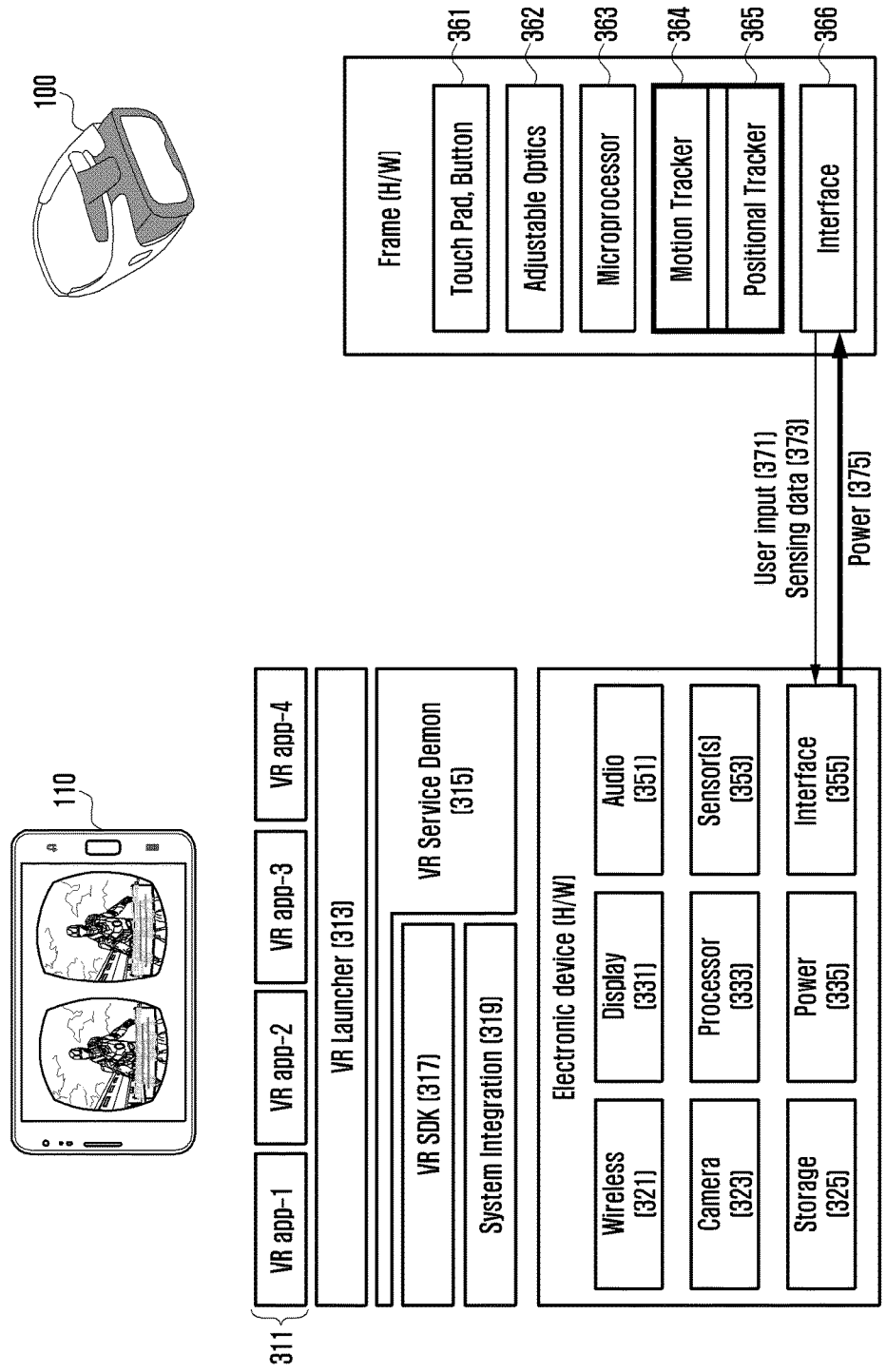
FIG. 3A illustrates the configurations of an electronic device and a head-mounted device that are coupled to each other according to embodiments of the present disclosure.

FIG. 3A illustrates the configurations of an electronic device and a head-mounted device that are coupled to each other according to embodiments of the present disclosure.

Referring to FIG. 3A, software of the electronic device 110 may include VR apps 311, VR launcher 313, VR service demon 315, VR SDK 317, and system integration 319.

The software of the electronic device 110 may include the VR dedicated software development kit (VR SDK) 317 for providing a VR image, and a VR dedicated system driver for driving the VR SDK 317 by hardware.

The VR launcher 313 may display the executable VR application list (VR apps) 311 with icons in the same concept as a VR home screen. The VR launcher 313 may be automatically executed if the electronic device 110 and the head-mounted device 100 are connected to each other by hardware. The VR service demon 315 may command to separate an image that is a monocular image into binocular images if a signal indicating that the head-mounted device 100 is connected thereto is received from an interface 355.

The electronic device 110 may include a wireless communicator 321, a camera 323, a storage 325, a display 331, a processor 333, a power supply 335, an audio processor 351, a sensor 353, and an interface 355.

The wireless communicator 321 may connect communication between the electronic device 110 and the head-mounted device 100. For example, the wireless communicator 321 may be connected to a network through wireless communication to communicate with the head-mounted device 100. The wireless communication may include Wi-Fi, BT, and NFC. The wireless communication may include at least one of cellular communications, such as long term evolution (LTE), LTE-Advanced (LTE-A), code division multiple access (CDMA), wideband CDMA (WCDMA), universal mobile telecommunications system (UMTS), wireless broadband (WiBro), and GSM.

The camera 323 may support a see-through mode or a positional tracking. In embodiments of the present disclosure, the head-mounted device 100 may provide the see-through mode using a rear camera of the electronic device 110. The head-mounted device 100 may provide augmented reality (AR) to a preview screen of the rear camera.

The storage 325 may be provided with a program memory for storing an operation program of the electronic device 110 and a data memory for storing data, such as log information that is generated during execution of the program, content, and objects.

The power supply 355 may include a PMIC and a battery, and may supply power to at least one module.

The interface module 355 may communicate with the head-mounted device 100 through wired communication. The wired communication may include, for example, at least one of a universal serial bus (USB), a high definition multimedia interface (HDMI), a recommended standard 232 (RS-232), and a plain old telephone service (POTS). The interface module 355 may receive sensor data from the head-mounted device 100 and may supply the power to the head-mounted device 100 through communication with the head-mounted device 100.

The sensor 353 may sense whether to mount the head-mounted device 100 and motion of the head of the user. The sensor 353 may sense the motion of the head of the user who wears the head-mounted device 100. The sensor 353 may sense whether to mount the head-mounted device 100 through sensing of at least one of IR recognition, pressure recognition, and capacitance (or permittivity) variation.

The audio processor 351 may transmit an audio signal that is input from the processor 333 to a speaker (SPK), and may transfer an audio signal, such as voice, that is input from a microphone (MIC). The speaker may output audio data that is received from an external device through the wireless communicator 321 or that is stored in the storage 325. The speaker may output sound signals related to various operations (functions) that are performed by the electronic device 110. In embodiments of the present disclosure, the speaker may be an attachable and detachable earphone, a headphone, or a headset, which can be connected to the electronic device 110 through an external port.

The display 331 may display various screens according to the use of the head-mounted device 100 under the control of the processor 333. The display 331 may separate a virtual image into binocular images to be displayed.

The processor 333 may decode function execution commands of constituent elements of the head-mounted device 100 and may execute an operation or data process according to the decoded command. For example, the processor 333 may drive the OS or an embedded software program to control a plurality of hardware constituent elements connected to the processor 333. The processor 333 may include an application processor (AP), a communication processor (CP), and a sensor hub.

The head-mounted device 100 may include a touchpad or buttons 361, an adjustable optics 362, a microprocessor 363, a motion tracker 364, a positional tracker 365, and an interface 366.

The head-mounted device 100 may further include a sensor that is added to provide a function that is not supported by the electronic device 110 or to provide a more accurate function. For example, the head-mounted device 100 may include a motion sensor for sensing motion of the head of the user, a positional tracking sensor (magnetic field type or IR camera type) for sensing an absolute motion of the user, a proximity sensor for sensing whether to mount the head-mounted device 100, and an electrostatic material sensor.

If the electronic device 110 is mounted on the head-mounted device 100, the head-mounted device 100 may transfer user input information that is input through the touchpad or the button and sensor data 373 through sensing of the user's motion to the electronic device 110. The electronic device 110 may generate an image related to the virtual reality based on the received user input information 371 and sensor data 373.

The head-mounted device 100 may receive the power 375 that is required by the head-mounted device 100 from the electronic device 110. In other words, as being connected to the electronic device 110 through HDMI or USB, the head-mounted device 100 may transmit/receive the user input information 371, the sensor data 373, and the power 375.

Figure 3B:
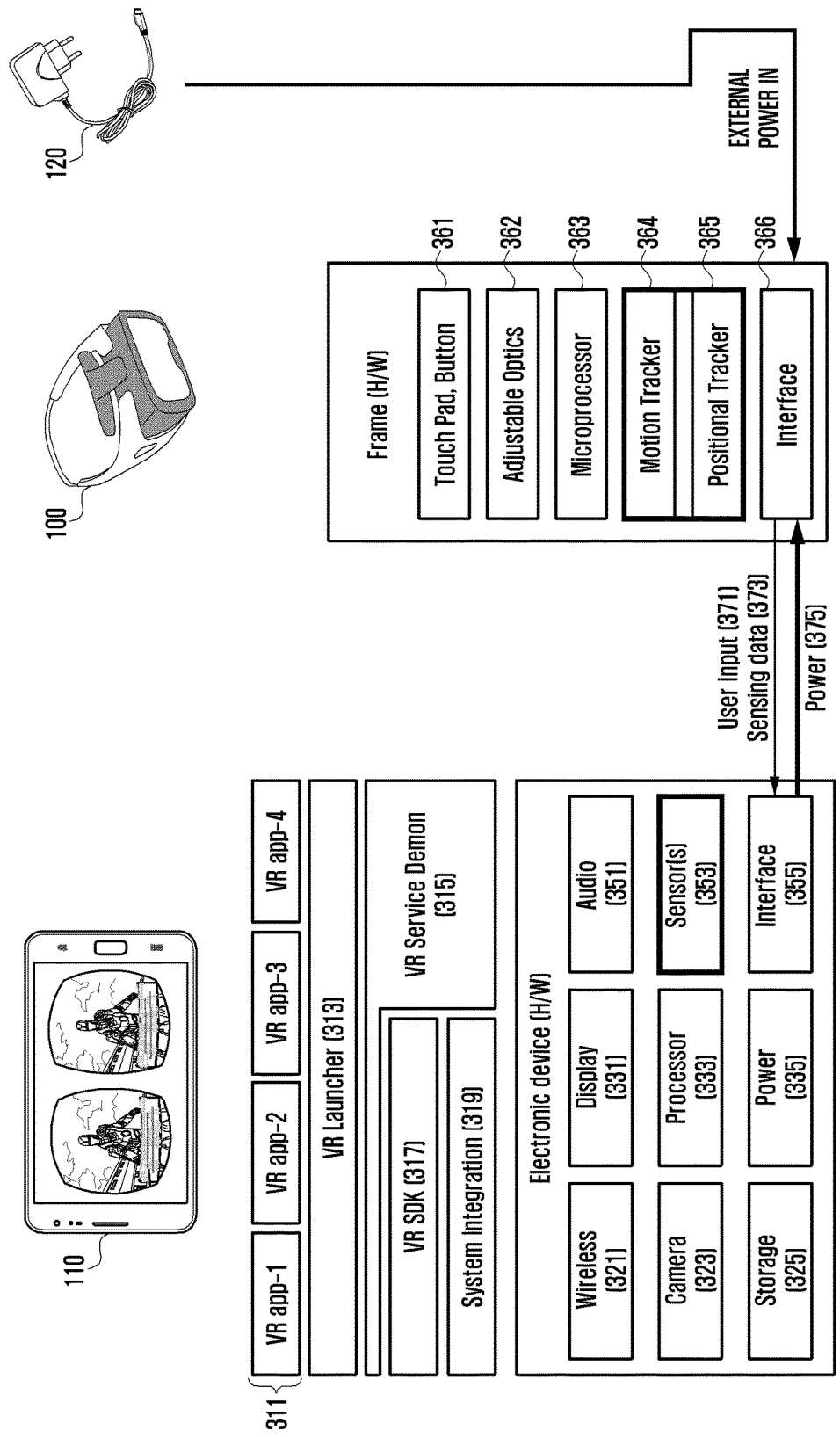
FIG. 3B illustrates the configurations of an electronic device and a head-mounted device to which an external power supply, such as a charger, is connected when they are coupled to each other according to embodiments of the present disclosure.

FIG. 3B illustrates the configurations of an electronic device and a head-mounted mounted device to which an external power supply is connected when they are coupled to each other according to embodiments of the present disclosure.

Referring to FIG. 3B, since the configurations of the head-mounted device 100 and the electronic device 110 are similar to the configurations as described above with reference to FIG. 3A, the detailed explanation thereof will be omitted.

The head-mounted device 100 may be connected to an external power supply 120. For example, the head-mounted device 100 may be connected to the external power supply 120 through the interface 366, and may receive the power from the external power supply 120.

The head-mounted device 100 may supply the power that is supplied from the external power supply 120 through the interface 366 to the electronic device 110. Through this, the role of the head-mounted device 100 may be switched from a host that supplies the power to a client that receives the power. Since the electronic device 110 preferentially use the power that is supplied from the head-mounted device 100, power consumption of the battery 335 can be saved.

According to embodiments, an electronic device that is detachably coupled to a frame of a head-mounted device that can be mounted on a head of a user includes a display, a battery, a communication interface, at least one sensor, a processor electrically connected to the display, the battery, the communication interface, and the at least one sensor, and a memory electrically connected to the processor, wherein the memory, when executed, stores instructions that cause the processor to receive at least one signal from the head-mounted device through the communication interface, to sense whether the head-mounted device is electrically connected to an external power supply based on the at least one received signal, and to control the electronic device based on the sensing.

The instructions may cause the processor to acquire information related to the head-mounted device, the electronic device, or the user using the at least one sensor and to control the electronic device further based on the acquired information.

The instructions may cause the processor to track motion of the head of the user as a control of the electronic device further based on the acquired information.

The instructions may cause the processor to adjust a power that is supplied from the battery to the head-mounted device as a control of the electronic device based on the sensing.

The at least one sensor may include at least one of an acceleration sensor, a gyro sensor, a geomagnetic sensor, a magnetic sensor, a proximity sensor, a gesture sensor, a grip sensor, and a biosensor.

The at least one sensor may be the same type as the at least one sensor included in the head-mounted device.

The instructions may cause the processor to control the electronic device further based on the at least one received signal if the at least one received signal includes a signal that is generated by the sensor of the same type as the sensor included in the head-mounted device.

According to embodiments, an electronic device that is detachably coupled to a head-mounted device that can be mounted on a head of a user includes a display, a battery, a communication interface, at least one sensor, a processor electrically connected to the display, the battery, the communication interface, and the at least one sensor, and a memory electrically connected to the processor, wherein the memory, when executed, stores instructions that cause the processor to receive at least one signal from the head-mounted device through the communication interface, to acquire information related to the head-mounted device, the electronic device, or the user using the at least one sensor, and to control the electronic device based on a state of the at least one received signal.

The instructions may cause the processor to determine whether the at least one received signal is a normal signal and to control the electronic device if the at least one received signal is abnormal.

The instructions may cause the processor to determine whether the at least one received signal is received for a predetermined time and to control the electronic device if the at least one signal is not received for the predetermined time.

The instructions may cause the processor to track motion of the head of the user as a control of the electronic device further based on the acquired information.

The instructions may cause the processor to track motion of the head of the user as a control of the electronic device based on sensor data that is received from the at least one sensor if the at least one received signal is abnormal.

The instructions may cause the processor to track motion of the head of the user as a control of the electronic device based on sensor data that is received from the at least one sensor if the at least one signal is not received for the predetermined time.

Figure 4:
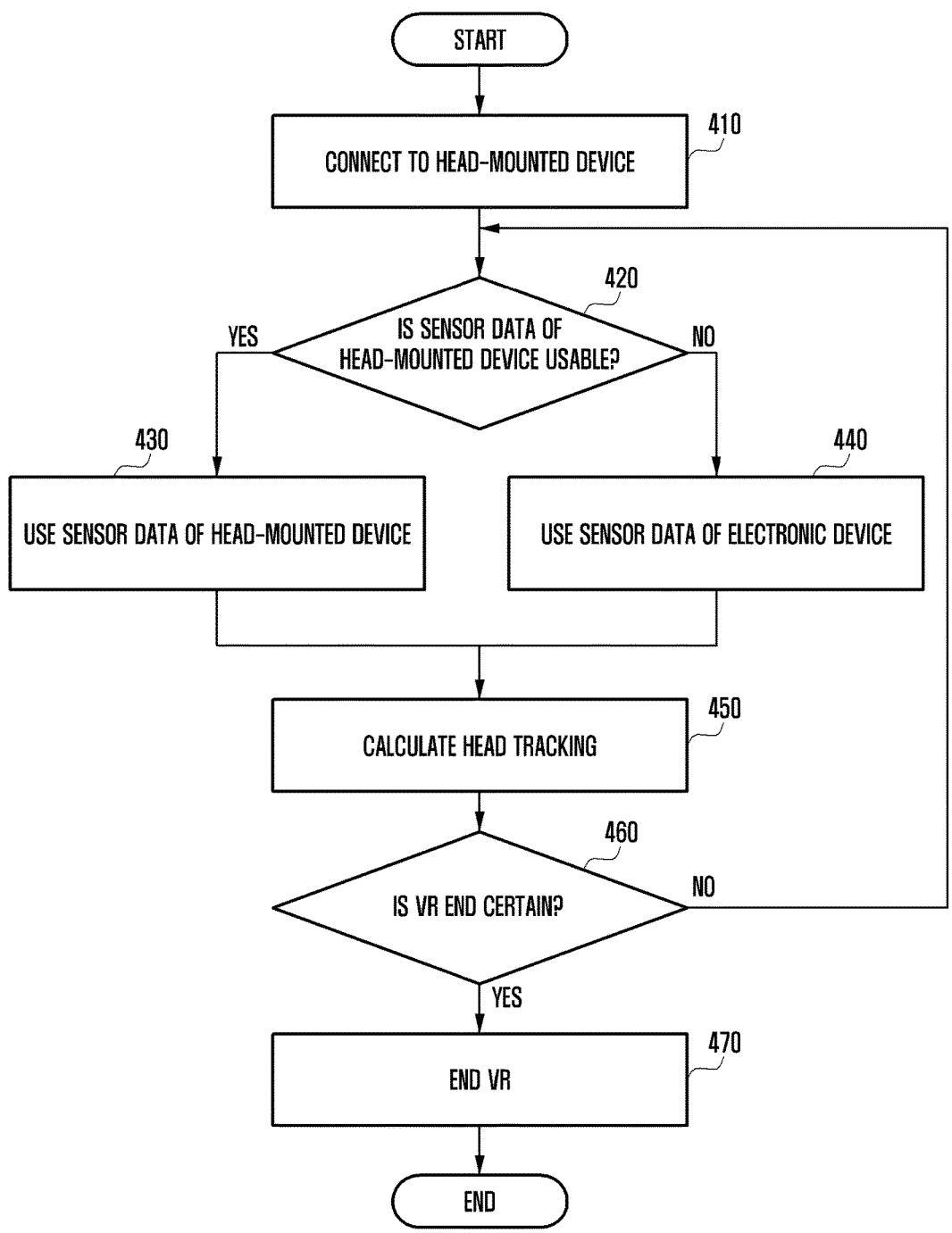
FIG. 4 illustrates a method for selectively using sensor data for head tracking of an electronic device according to embodiments of the present disclosure.

FIG. 4 illustrates a method for selectively using sensor data for head tracking of an electronic device according to embodiments of the present disclosure.

Referring to FIG. 4, in step 410, the electronic device 110 may be connected to the head-mounted device 100. For example, the electronic device 110 may be connected to the head-mounted device 100 through wired communication. The wired communication may include, for example, at least one of a USB, a high definition multimedia interface (HDMI), a recommended standard 232 (RS-232), and a plain old telephone service (POTS). The electronic device 110 may receive sensor data from the head-mounted device 100 and may supply the power to the head-mounted device 100 through communication with the head-mounted device 100.

In step 420, the electronic device 110 may confirm whether sensor data can be acquired from the head-mounted device 100. For example, the sensor data may not be transmittable from the head-mounted device due to the influence of an external environment, such as contact inferiority, interrupt occurrence, software error, or lack of power supply. In particular, the head-mounted device 100 requires power supply in order to operate sensors 220, 364, and 365, and in the following case, a situation where head tracking is physically impossible due to the designed structure of the head-mounted device 100 will be described.

When the electronic device 110 operates as a USB host and the head-mounted device 100 operates as a USB client, the head-mounted device 100 may receive the power that is supplied from the electronic device 110. That is, the electronic device 110 may supply the power to the head-mounted device 100 using the battery 335.

When an external power supply 120 is connected to the head-mounted device 100, the head-mounted device 100 may receive the power that is supplied from the external power supply 120 through changing of the existing power supply path.

The external power supply 120 may be temporarily separated from the head-mounted device 100. In this case, since the head-mounted device 100 uses only the power that is supplied from the external power supply 120, the power supply to the head-mounted device 100 may be temporarily interrupted. Thereafter, if the battery 335 of the electronic device 110 resupplies the power to the head-mounted device 100, firmware of the head-mounted device 100 may be rebooted that cause a situation where the head tracking is temporarily impossible to occur for about 2 to 3 seconds. That is, a situation where the electronic device 110 is unable to receive the sensor data from the head-mounted device 100 may occur.

If the sensor data can be acquired from the head-mounted device 100, the electronic device 110 proceeds to step 430, and thus the sensor data of the head-mounted device 100 can be used.

If the sensor data cannot be acquired from the head-mounted device 100, the electronic device 110 proceeds to step 440, and thus the sensor data of the electronic device 110 can be used. That is, if the sensor data is unable to be transmitted from the head-mounted device 100 due to the influence of the external environment, such as contact inferiority, interrupt, error, or lack of current, the electronic device 110 can consecutively use the sensor data using the sensor 353 built in the electronic device 110. Through this, motion sickness or a headache that occurs due to inconsistency between a user's action and visual information can be prevented from occurring.

The electronic device 110 may sense the motion of the user's head in advance using the sensor data that is acquired in step 430 or 440.

In step 460, the electronic device 110 may determine whether the user ends content related to virtual reality.

If the user does not end the content related to the virtual reality, the electronic device 110 returns to step 420 and may confirm whether the sensor data can be continuously acquired from the head-mounted device 100.

If the user ends the content related to the virtual reality, the electronic device 110 proceeds to step 470 and may end the virtual reality.

FIGS. 5, 6, 7, 8 and 9 illustrate a method for an electronic device to selectively use sensor data in accordance with attachment and detachment of an external power supply when the electronic device and a head-mounted device are coupled to each other according to embodiments of the present disclosure.

Referring to FIGS. 5, 6, 7, 8 and 9, blocks may be indicated with different shades depending on whether the sensor included in the electronic device 110 or the head-mounted device 100 operates. For example, the sensor that is in operation may be indicated with a shade, while the sensor that temporarily stops its operation may be indicated without a shade. As another embodiment, all the sensors included in the electronic device 110 or the head-mounted device 100 may operate, and the sensor data may be selectively received from at least one sensor.

Figure 5:
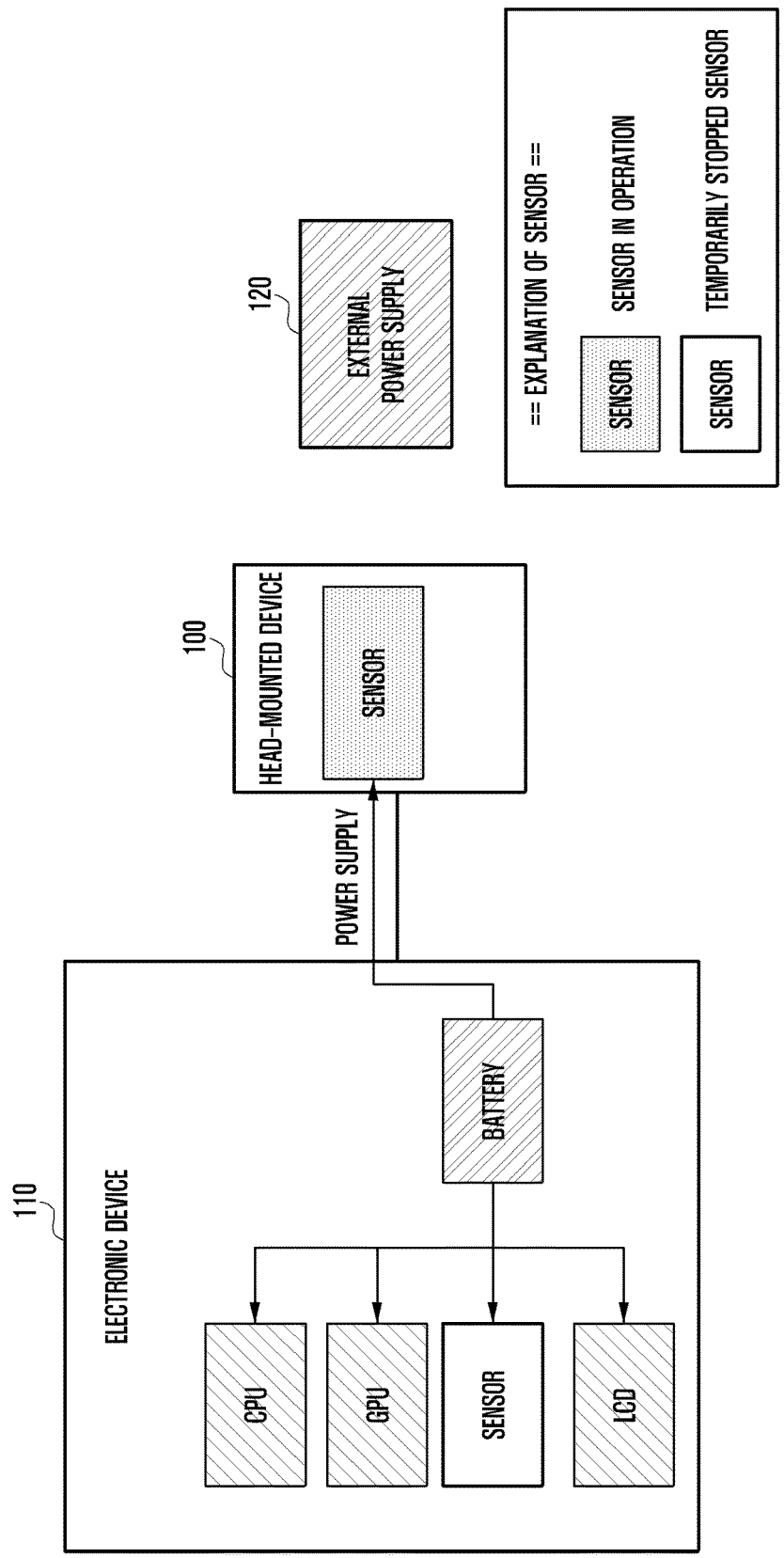
FIGS. 5, 6, 7, 8 and 9 illustrate a method for an electronic device to selectively use sensor data in accordance with attachment and detachment of an external power supply when the electronic device and a head-mounted device are coupled to each other according to embodiments of the present disclosure.

Referring to FIG. 5, the electronic device 110 may be connected to the head-mounted device 100, and the power may be supplied from the battery of the electronic device 110 to the head-mounted device 100. The sensor of the head-mounted device 100 may receive the power that is supplied from the electronic device 110 to operate, and may transmit the acquired sensor data to the electronic device 110. In this case, the sensor of the electronic device 110 may be maintained in a temporary stop state to reduce the battery consumption of the electronic device 110.

Figure 6:
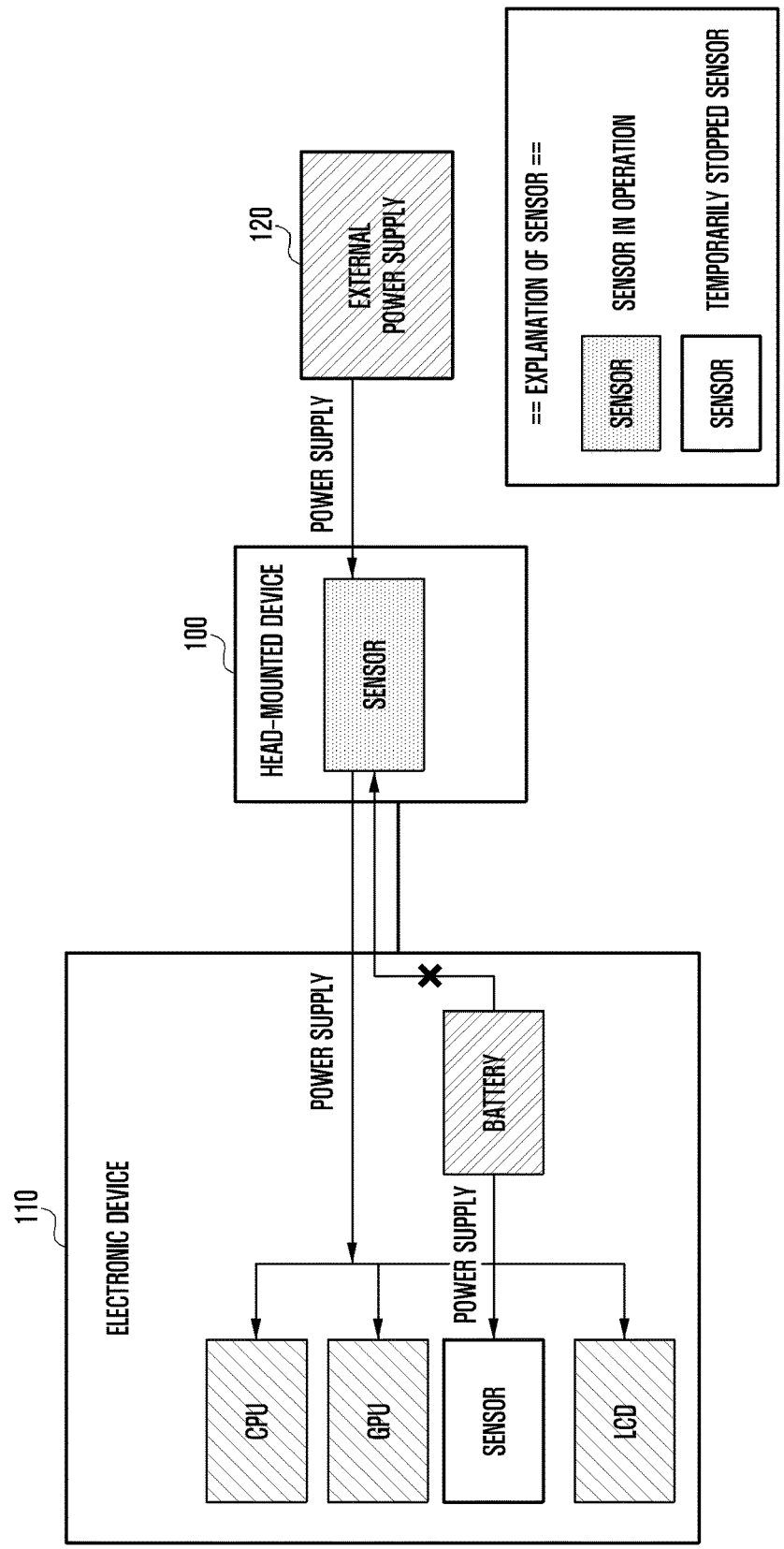

Referring to FIG. 6, the electronic device 110 may be connected to the head-mounted device 100, and the head-mounted device 100 may be connected to the external power supply 120. The head-mounted device 100 may receive the power that is supplied from the external power supply 120 and may operate the sensor to collect the sensor data. Since the head-mounted device 100 receives the power supplied from the external power supply 120, the electronic device 110 may interrupt the power supply from the battery to the head-mounted device 100. The electronic device 110 may also receive the power that is supplied from the external power supply 120 through the head-mounted device 100. The power may be supplied from the external power supply 120 to at least one component or module of the electronic device 110. The battery of the electronic device 110 may be charged through the power supply from the external power supply 120. However, in order to prevent the battery of the electronic device 110 from overheating, it may be preferred not to charge the battery of the electronic device 110.

Referring to FIG. 6, it is indicated that the battery of the electronic device 110 supplies the power to other components or modules of the electronic device 110. However, when the external power supply 120 is connected to save the power of the battery, the power supply to other components or modules may be interrupted.

Figure 7:
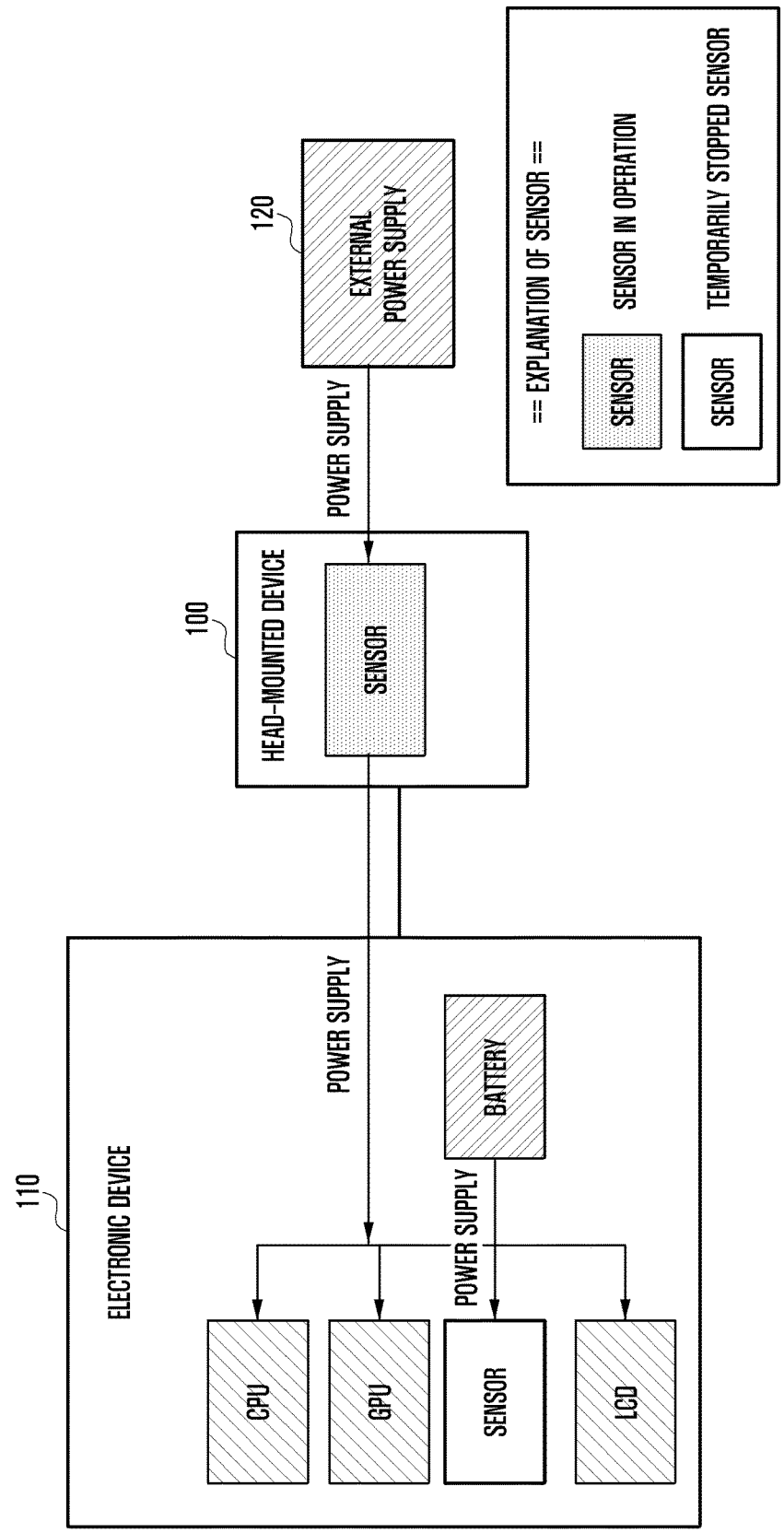

Referring to FIG. 7, when the external power supply 120 is connected to the head-mounted device 100 and the head-mounted device 100 is connected to the electronic device 110, the electronic device 110 may continuously receive the sensor data from the head-mounted device 100, and may continuously receive the power supply from the external power supply 120.

Figure 8:
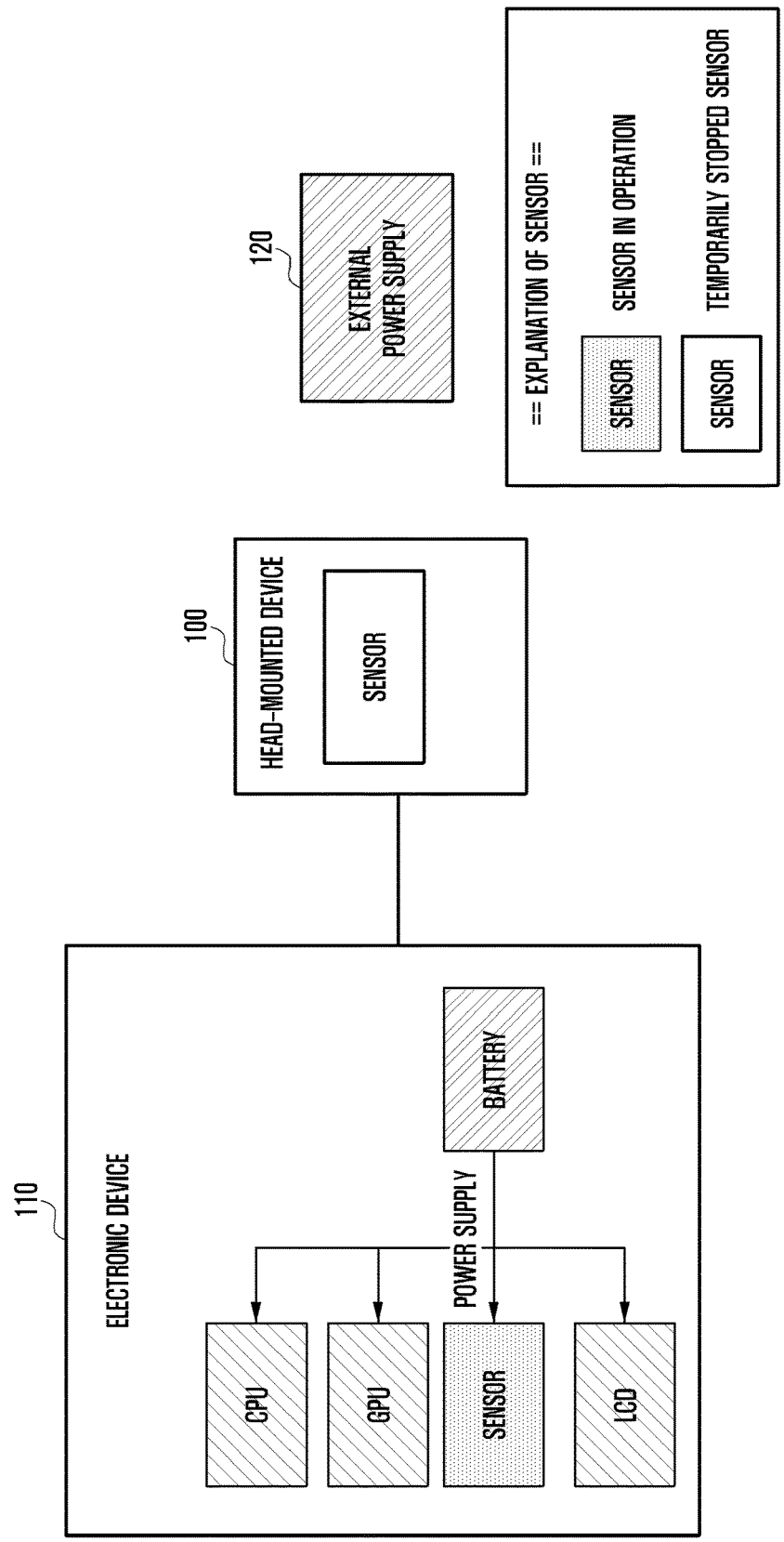

Referring to FIG. 8, the external power supply 120 and the head-mounted device 100 may be instantaneously separated from each other in the state of FIG. 7. In this case, since the head-mounted device 100 receives the power only from the external power supply 120, the power supply thereto is instantaneously intercepted, causing the sensor of the head-mounted device 100 to be unable to operate.

According to embodiments of the present disclosure, if the sensor data is not received from the head-mounted device 100 for a predetermined time, such as 1 to 2 ms, the electronic device 110 may determine that a problem occurs in the external environment of the head-mounted device 100, and may operate the sensor of the electronic device 110. That is, the power may be supplied from the battery of the electronic device 110 to the sensor of the electronic device 110, and the sensor data can be continuously acquired from the sensor of the electronic device 110. Through this, continuity of the sensor data can be maintained. The predetermined time, such as 1 to 2 ms, may be set to prevent user's motion sickness or headache, and may be varied by a manufacturer or a user.

Figure 9:
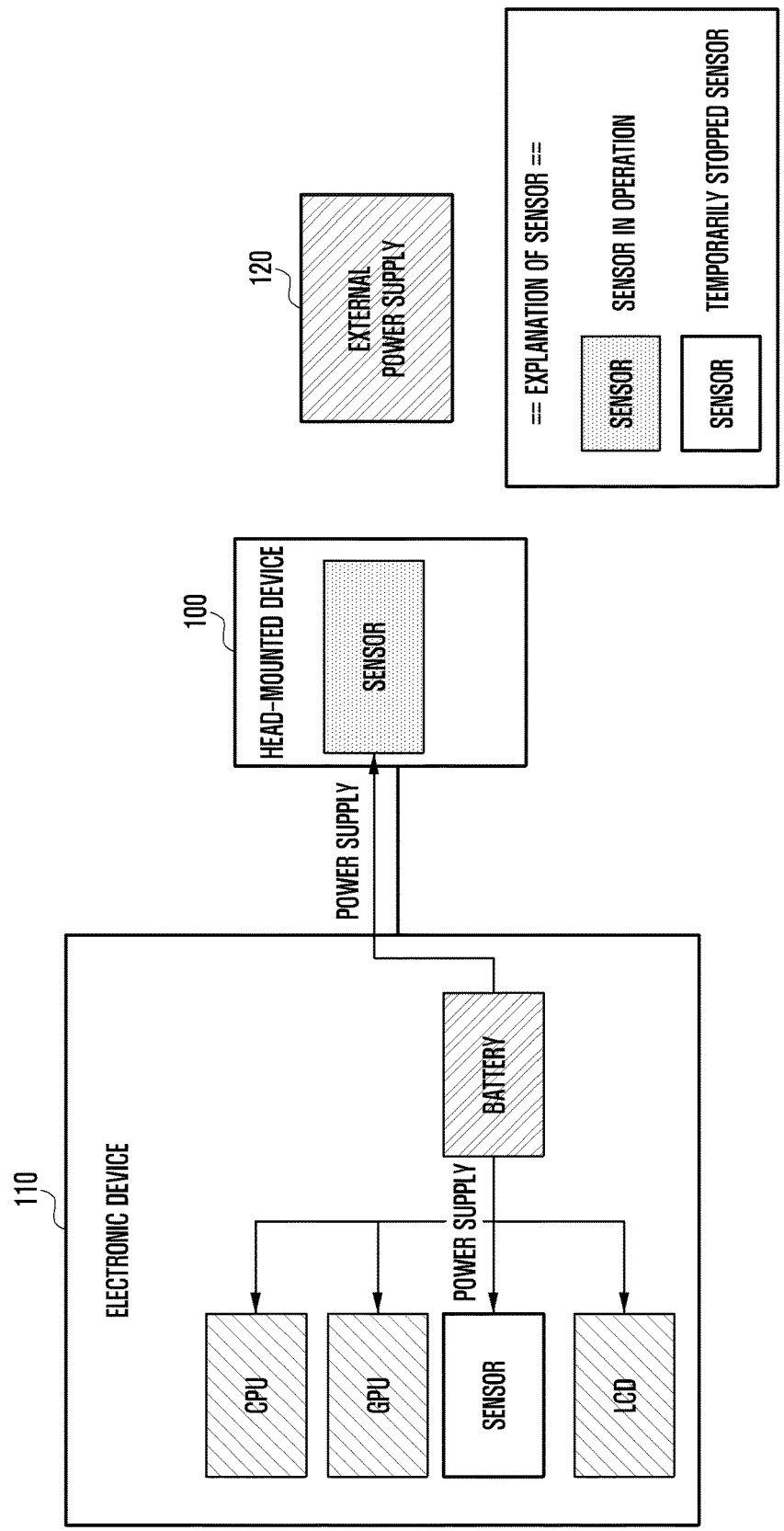

Referring to FIG. 9, the electronic device 110 may resupply the power to the head-mounted device 100 as shown in FIG. 5. The head-mounted device 100 may receive again the power from the electronic device 110 to operate the sensor, and may transmit the sensor data that is collected by the sensor to the electronic device 110. If the sensor data is received from the head-mounted device 100, the electronic device 110 may maintain the continuity of the sensor data through switching from the sensor of the electronic device 110 to the sensor of the head-mounted device 100.

As described in FIGS. 5, 6, 7, 8 and 9 above, the electronic device 110 can consecutively acquire the sensor data in any case, and thus can output the image related to the virtual reality to correspond to the user's motion. Accordingly, the user's motion sickness due to the inconsistency of the sensor data can be resolved.

Figure 10:
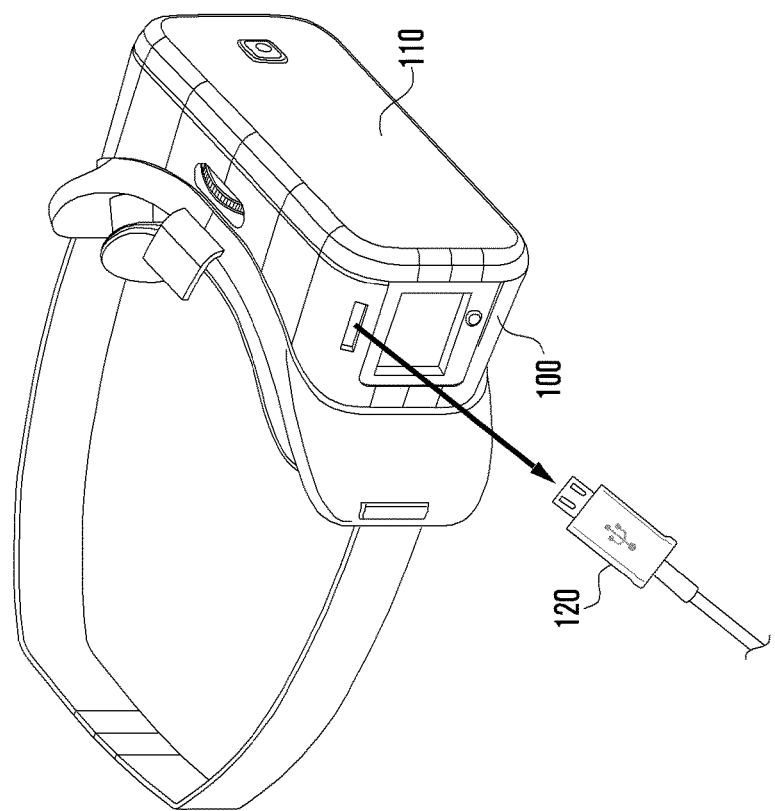
FIG. 10 illustrates connection with an external power supply when an electronic device and a head-mounted device] are coupled to each other according to embodiments of the present disclosure.

FIG. 10 illustrates connection with an external power supply when an electronic device and a head-mounted device are coupled to each other according to embodiments of the present disclosure.

Referring to FIG. 10, the electronic device 110 is coupled to the head-mounted mounted device 100, and may serve as a processor that processes an image related to virtual reality and a display that outputs the image related to the virtual reality.

The external power supply 120 may include a USB type interface, and through this, may be connected to an input/output interface of the head-mounted device 100.

Figure 11:
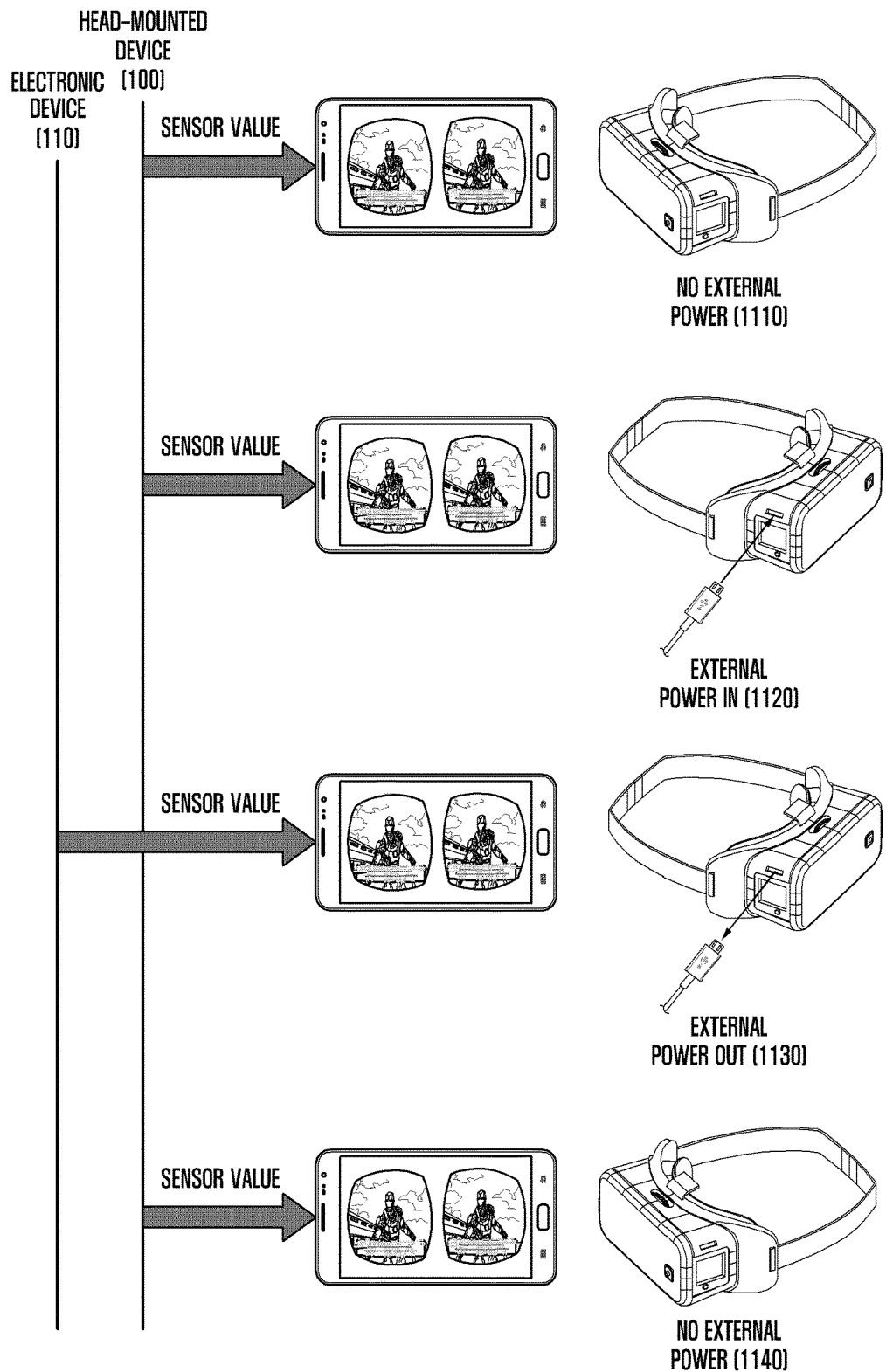
FIG. 11 illustrates a method according to an embodiment for an electronic device to selectively use sensor data in accordance with attachment and detachment of an external power supply when the electronic device and a head-mounted device are coupled to each other according to embodiments of the present disclosure.

FIG. 11 illustrates a method according to an embodiment for an electronic device to selectively use sensor data in accordance with attachment and detachment of an external power supply when the electronic device and a head-mounted device are coupled to each other according to embodiments of the present disclosure.

Referring to FIG. 11, when the external power supply 120 is not connected in step 1110, the electronic device 110 may acquire the sensor data from the head-mounted device 100.

If the external power supply 120 is connected, the electronic device 110 can continuously acquire the sensor data from the head-mounted device 100.

If the power supply from the external power supply 120 is intercepted in step 1130, the electronic device 110 may acquire the sensor data from the internal sensor of the electronic device 110, since the power supply from the external power supply 120 is intercepted and thus the sensor of the head-mounted device 100 is in an inoperable state. If the sensor data is not received from the head-mounted device 100 for a predetermined time, such as 1 to 2 ms, the electronic device 110 may determine that a problem occurs in the external environment of the head-mounted device 100, and may operate the internal sensor of the electronic device 110. That is, the power may be supplied from the battery of the electronic device 110 to the sensor of the electronic device 110, and the sensor data can be continuously received from the internal sensor of the electronic device 110. Through this, continuity of the sensor data can be maintained. It may be confirmed over the predetermined time, such as 1 to 2 ms whether data is lost. The predetermined time may be varied by a manufacturer or a user.

When the external power supply 120 is not connected in step 1140, the electronic device 110 may re-acquire the sensor data from the head-mounted device 100. Since the sensor of the head-mounted device 100 can be operated through the battery inside the electronic device 110, the sensor data can be acquired from the head-mounted device 100.

Figure 12:
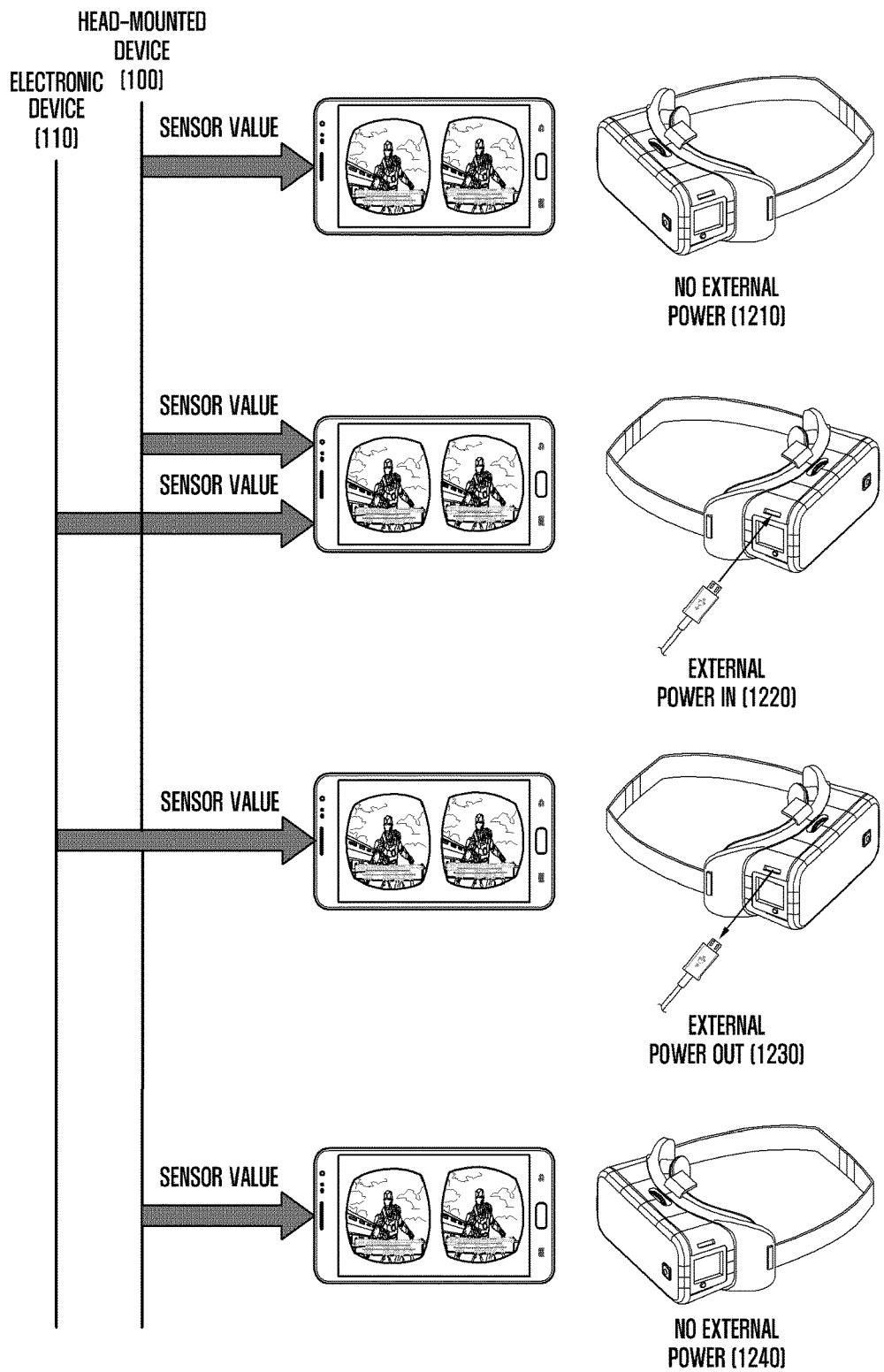
FIG. 12 illustrates a method according to another embodiment for an electronic to selectively use sensor data in accordance with attachment and detachment of an external power supply when the electronic device and a head-mounted device are coupled to each other according to embodiments of the present disclosure.

FIG. 12 illustrates a method according to another embodiment for an electronic device to selectively use sensor data in accordance with attachment and detachment of an external power supply when the electronic device and a head-mounted device are coupled to each other according to embodiments of the present disclosure.

Referring to FIG. 12, when the external power supply 120 is not connected in step 1210, the electronic device 110 may acquire the sensor data from the head-mounted device 100. The electronic device 110 may acquire the sensor data from the head-mounted device 100 and the internal sensor of the electronic device 110.

If the external power supply 120 is connected in step 1220, the electronic device 110 may acquire the sensor data from the head-mounted device 100 and the internal sensor of the electronic device 110. Through acquisition of the sensor data from not only the head-mounted device 100 but also the internal sensor of the electronic device 110, the method can handle when the power supply from the external power supply 120 is intercepted and thus the continuity of the sensor data is disconnected.

If the power supply from the external power supply 120 is intercepted in step 1230, the electronic device 110 may acquire the sensor data from the internal sensor of the electronic device 110, since the power supply from the external power supply 120 is intercepted and thus the sensor of the head-mounted device 100 is in an inoperable state. However, since the electronic device 110 can continuously acquire the sensor data from the internal sensor of the electronic device 110, the continuity of the sensor data can be maintained. Accordingly, the user of the electronic device 110 can be prevented from suffering from the motion sickness or headache.

When the external power supply 120 is not connected in step 1240, the electronic device 110 may re-acquire the sensor data from the head-mounted device 100. Since the sensor of the head-mounted device 100 can be operated through the battery inside the electronic device 110, the sensor data can be acquired from the head-mounted device 100.

Figure 13:
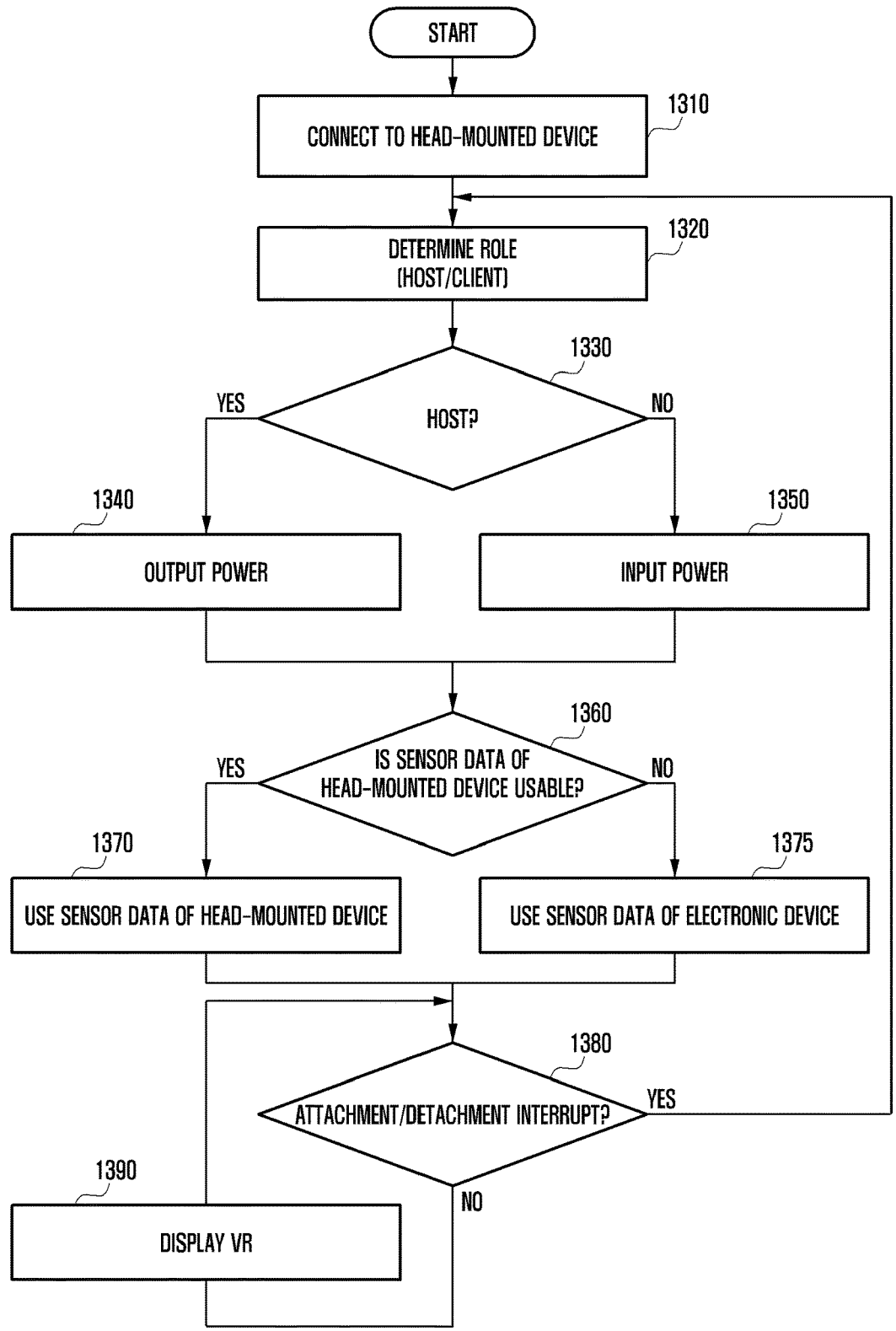
FIG. 13 illustrates a method for an electronic device to output a virtual reality screen when the electronic device and a head-mounted device are coupled to each other according to embodiments of the present disclosure.

FIG. 13 illustrates a method for an electronic device to output a virtual reality screen when the electronic device is coupled to a head-mounted device according to embodiments of the present disclosure.

Referring to FIG. 13, in step 1310, the electronic device 110 may be connected to the head-mounted device 100, such as through wired communication including at least one of a USB, a HDMI, RS-232, and a POTS. The electronic device 110 may receive the sensor data from the head-mounted device 100 and may supply the power to the head-mounted device 100 through communication with the head-mounted device 100.

In step 1320, the electronic device 110 may determine the role of power supply. Specifically, the electronic device 110 may determine whether to serve as a USB host or a USB client. For example, when the head-mounted device 100 is connected to the external power supply 120, it is not required to supply the power to the head-mounted device 100, and in order to reduce power consumption of the internal battery, the electronic device 110 may serve as a client. As another example, when the head-mounted device 100 is not connected to the external power supply 120, it is required to supply the power to the head-mounted device 100, and thus the electronic device 110 may serve as a host.

In step 1330, the electronic device 110 may confirm whether to serve as a host.

If the electronic device 110 serves as a host, the electronic device 110 proceeds to step 1340 to supply the power to the head-mounted device 100.

If the electronic device 110 does not serve as a host, the electronic device 110 proceeds to step 1350 to receive the power from the external power supply 120 through the head-mounted device 100.

In step 1360, the electronic device may confirm whether the sensor data can be acquired from the head-mounted device 100. For example, the sensor data may be unable to be transmitted from the head-mounted device 100 due to the influence of the external environment, such as contact inferiority, interrupt occurrence, software error, or lack of power supply. In particular, the head-mounted device 100 requires the power supply in order to operate sensors 220, 364, and 365, and in the following case, a situation where head tracking is physically impossible due to the designed structure of the head-mounted device 100 will be described.

When the electronic device 110 operates as a USB host and the head-mounted device 100 operates as a USB client, the head-mounted device 100 may receive the power that is supplied from the electronic device 110. That is, the electronic device 110 may supply the power to the head-mounted device 100 using the battery 335.

When an external power supply, such as charger 120, is connected to the head-mounted device 100, the head-mounted device 100 may receive the power that is supplied from the external power supply 120 through changing of the existing power supply path.

The external power supply 120 may be temporarily separated from the head-mounted device 100. In this case, since the head-mounted device 100 uses only the power that is supplied from the external power supply 120, the power supply to the head-mounted device 100 may be temporarily interrupted. Thereafter, if the battery 335 of the electronic device 110 resupplies the power to the head-mounted device 100, firmware of the head-mounted device 100 may be rebooted that cause a situation where the head tracking is temporarily impossible to occur for a predetermined time, such as about 2 to 3 seconds. That is, a situation where the electronic device 110 is unable to receive the sensor data from the head-mounted device 100 may occur.

If the sensor data can be acquired from the head-mounted device 100, the electronic device 110 proceeds to step 1370, and thus the sensor data of the head-mounted device 100 can be used.

If the sensor data cannot be acquired from the head-mounted device 100, the electronic device 110 proceeds to step 1375, and thus the sensor data of the electronic device 110 can be used. That is, if the sensor data is unable to be transmitted from the head-mounted device 100 due to the influence of the external environment, such as contact inferiority, interrupt, error, or lack of current, the electronic device 110 may consecutively use the sensor data using the sensor 353 built in the electronic device 110.

In step 1380, the electronic device 110 may determine whether an attachment/detachment interrupt of the external power supply 120 and the head-mounted device 100 occurs.

If the attachment/detachment interrupt of the external power supply 120 and the head-mounted device 100 occurs, the electronic device proceeds to step 1320 to determine again the role of the power supply of the electronic device 110.

According to embodiments of the present disclosure, if the attachment/detachment interrupt of the external power supply 120 and the head-mounted device 100 does not occur, the electronic device proceeds to step 1390 to continuously output an image related to virtual reality.

According to embodiments of the present disclosure, a method for tracking motion of a head of a user of an electronic device that is detachably coupled to a head-mounted device that can be mounted on the head of the user includes receiving at least one signal from the head-mounted device, sensing whether the head-mounted device is electrically connected to an external power supply based on the at least one received signal, and controlling the electronic device based on the sensing.

The method according to embodiments of the present disclosure may further include acquiring information related to the head-mounted device, the electronic device, or the user using at least one sensor, and controlling the electronic device based on the acquired information.

The controlling of the electronic device may include tracking motion of the head of the user based on the acquired information.

The controlling of the electronic device may include adjusting a power that is supplied from a battery of the electronic device to the head-mounted device based on the sensing.

The method according to embodiments of the present disclosure may further include determining whether the at least one received signal is a normal signal, and if the at least one received signal is abnormal, tracking the motion of the head of the user based on sensor data received from the at least one sensor.

The method according to embodiments of the present disclosure may further include determining whether the at least one received signal is received for a predetermined time, and if the at least one signal is not received for the predetermined time, tracking the motion of the head of the user based on sensor data received from the at least one sensor.

The at least one sensor may include at least one of an acceleration sensor, a gyro sensor, a geomagnetic sensor, a magnetic sensor, a proximity sensor, a gesture sensor, a grip sensor, and a biosensor.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an application-specific integrated circuit (ASIC) chip, a field-programmable gate array (FPGA), and a programmable-logic device for performing certain operations which have been known or are to be developed in the future.

Examples of computer-readable media include: magnetic media, such as hard disks, floppy disks, and magnetic tape; optical media such as compact disc read only memory (CD-ROM) disks and digital versatile disc (DVD); magneto-optical media, such as floptical disks, and hardware devices that are specially configured to store and perform program instructions, such as ROM, random access memory (RAM), and flash memory. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Embodiments of the present disclosure can measure an angle between displays by installing at least one sensor in a housing including a plurality of screens. Various functions can be provided for a user by utilizing the measured angle.

Modules or programming modules according to the embodiments of the present disclosure may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

Although embodiments of the present disclosure have been described in detail above, it should be understood that many variations and modifications of the basic inventive concept herein described, which may be apparent to those skilled in the art, will still fall within the spirit and scope of the embodiments of the present disclosure as defined in the appended claims and their equivalents.

What is claimed is:

1. An electronic device that is detachably coupled to a frame of a head-mounted device that can be mounted on a head of a user, the electronic device comprising:
   a display;
   a battery;
   a communication interface;
   at least one sensor;
   a processor electrically connected to the display, the battery, the communication interface, and the at least one sensor; and
   a memory electrically connected to the processor,
   wherein the memory stores instructions that, when executed, cause the processor to:
   receive at least one signal from the head-mounted device through the communication interface,
   identify whether the head-mounted device is electrically connected to an external power supply other than a power supply of the electronic device based on the at least one received signal,
   when the head-mounted device is electrically connected to the external power supply, display visual information according to a user's action based on sensor data acquired from the head-mounted device,
   while the head-mounted device is electrically connected to the external power supply, identify whether the head-mounted device is electrically disconnected from the external power supply based on the at least one received signal, and
   when the head-mounted device is electrically disconnected from the external power supply, display the visual information according to the user's action based on sensor data acquired from the at least one sensor of the electronic device other than at least one sensor of the head-mounted device so as to continuously display the visual information according to the user's action.

2. The electronic device of claim 1, wherein the instructions further cause the processor to:
   acquire information related to the head-mounted device, the electronic device, or the user using the at least one sensor, and
   control the electronic device based on the acquired information.

3. The electronic device of claim 2, wherein the instructions further cause the processor to track motion of the head of the user as a control of the electronic device based on the acquired information.

4. The electronic device of claim 1, wherein the instructions further cause the processor to adjust a power that is supplied from the battery to the head-mounted device as a control of the electronic device based on the identifying.

5. The electronic device of claim 1, wherein the at least one sensor comprises at least one of an acceleration sensor, a gyro sensor, a geomagnetic sensor, a magnetic sensor, a proximity sensor, a gesture sensor, a grip sensor, and a biosensor.

6. The electronic device of claim 1, wherein the at least one sensor is a same type of sensor as the at least one sensor included in the head-mounted device.

7. The electronic device of claim 6, wherein the instructions further cause the processor to control the electronic device further based on the at least one received signal if the at least one received signal includes a signal that is generated by the same type of sensor as the sensor included in the head-mounted device.

8. A method for tracking motion of a head of a user of an electronic device, the electronic device being detachably coupled to a head-mounted device that can be mounted on the head of the user, the method comprising:
   receiving at least one signal from the head-mounted device;
   identifying whether the head-mounted device is electrically connected to an external power supply other than a power supply of the electronic device based on the at least one received signal;
   when the head-mounted device is electrically connected to the external power supply, displaying visual information according to a user's action based on sensor data acquired from the head-mounted device;
   while the head-mounted device is electrically connected to the external power supply, identifying whether the head-mounted device is electrically disconnected from the external power supply based on the at least one received signal; and
   when the head-mounted device is electrically disconnected from the external power supply, displaying the visual information according to the user's action based on sensor data acquired from at least one sensor of the electronic device other than at least one sensor of the head-mounted device so as to continuously display the visual information according to the user's action.

9. The method of claim 8, further comprising:
   acquiring information related to the head-mounted device, the electronic device, or the user using at least one sensor; and
   controlling the electronic device based on the acquired information.

10. The method of claim 9, wherein the controlling of the electronic device comprises tracking motion of the head of the user based on the acquired information.

11. The method of claim 9, wherein the at least one sensor comprises at least one of an acceleration sensor, a gyro sensor, a geomagnetic sensor, a magnetic sensor, a proximity sensor, a gesture sensor, a grip sensor, and a biosensor.

12. The method of claim 8, wherein the controlling of the electronic device comprises adjusting a power that is supplied from a battery of the electronic device to the head-mounted device based on the identifying.

13. The method of claim 8, further comprising:
   determining whether the at least one received signal is a normal signal, and
   if the at least one received signal is abnormal, tracking the motion of the head of the user based on sensor data received from the at least one sensor.

14. The method of claim 8, further comprising:
   determining whether the at least one received signal is received for a predetermined time; and
   if the at least one signal is not received for the predetermined time, tracking the motion of the head of the user based on sensor data received from the at least one sensor.

* * * * *